Jan. 4, 1949.    V. CRONSTEDT    2,458,149
ROTOR CONSTRUCTION FOR TURBINES
Filed Aug. 23, 1944    2 Sheets-Sheet 1

INVENTOR

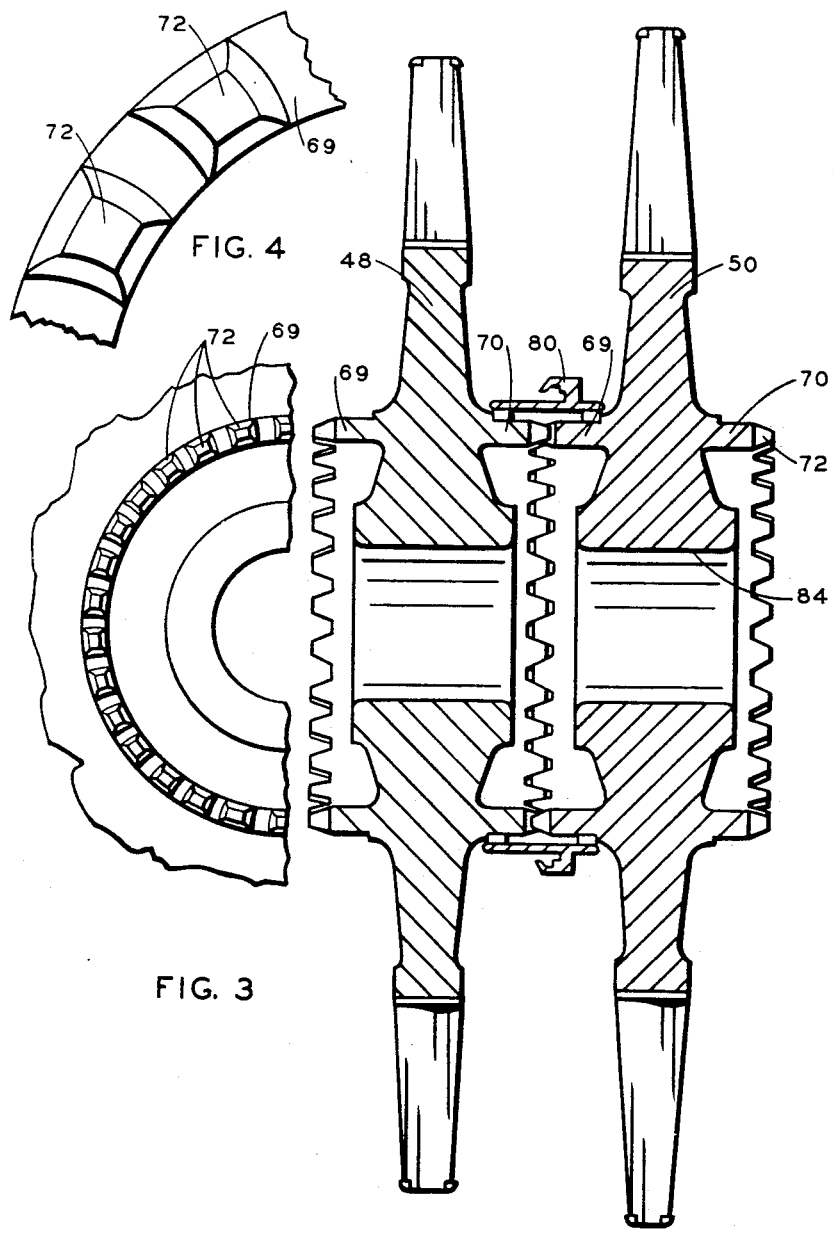

Patented Jan. 4, 1949

2,458,149

UNITED STATES PATENT OFFICE 2,458,149

ROTOR CONSTRUCTION FOR TURBINES

Val Cronstedt, Marlboro, Conn., assignor to United Aircraft Corporation, East Hartford, Conn., a corporation of Delaware Application August 23, 1944, Serial No. 550,881

5 Claims. (Cl. 253—39)

1

This invention relates to a turbine or compressor having a rotor built up of a number of discs clamped together to form a unitary assembly.

The copending application of Cronstedt, Serial Number 550,880, filed August 23, 1944 describes the use of face splines for aligning the adjoining discs of the rotor in which the surfaces of the splines are radial to permit relative radial expansion between adjoining discs. Such an arrangement is advantageous where a substantial temperature differential may exist between adjoining discs so that the amount of expansion is much greater in one disc than in another. A feature of this invention is an arrangement of the face splines so that relative radial expansion cannot take place.

In many turbines or compressor constructions, particularly where the temperature differential between successive stages is not too great, it may be desirable to provide against relative radial motion between adjoining discs in order that the rotor may be more stable and to prevent galling of the surfaces which might occur with some materials if radial movement were permitted. A feature of this invention is the use of face splines of the type in which the opposite surfaces of the teeth are curved about an axis spaced from the rotor axis.

Other objects and advantages will be apparent from the specification and claims, and from the accompanying drawings which illustrate an embodiment of the invention.

Fig. 2 is a fragmentary sectional view on a larger scale through two of the rotor discs.

Fig. 3 is a fragmentary end view showing the face splines in greater detail.

Fig. 4 is a fragmentary end view showing the curvature of the surfaces of the splines.

Figure 1:
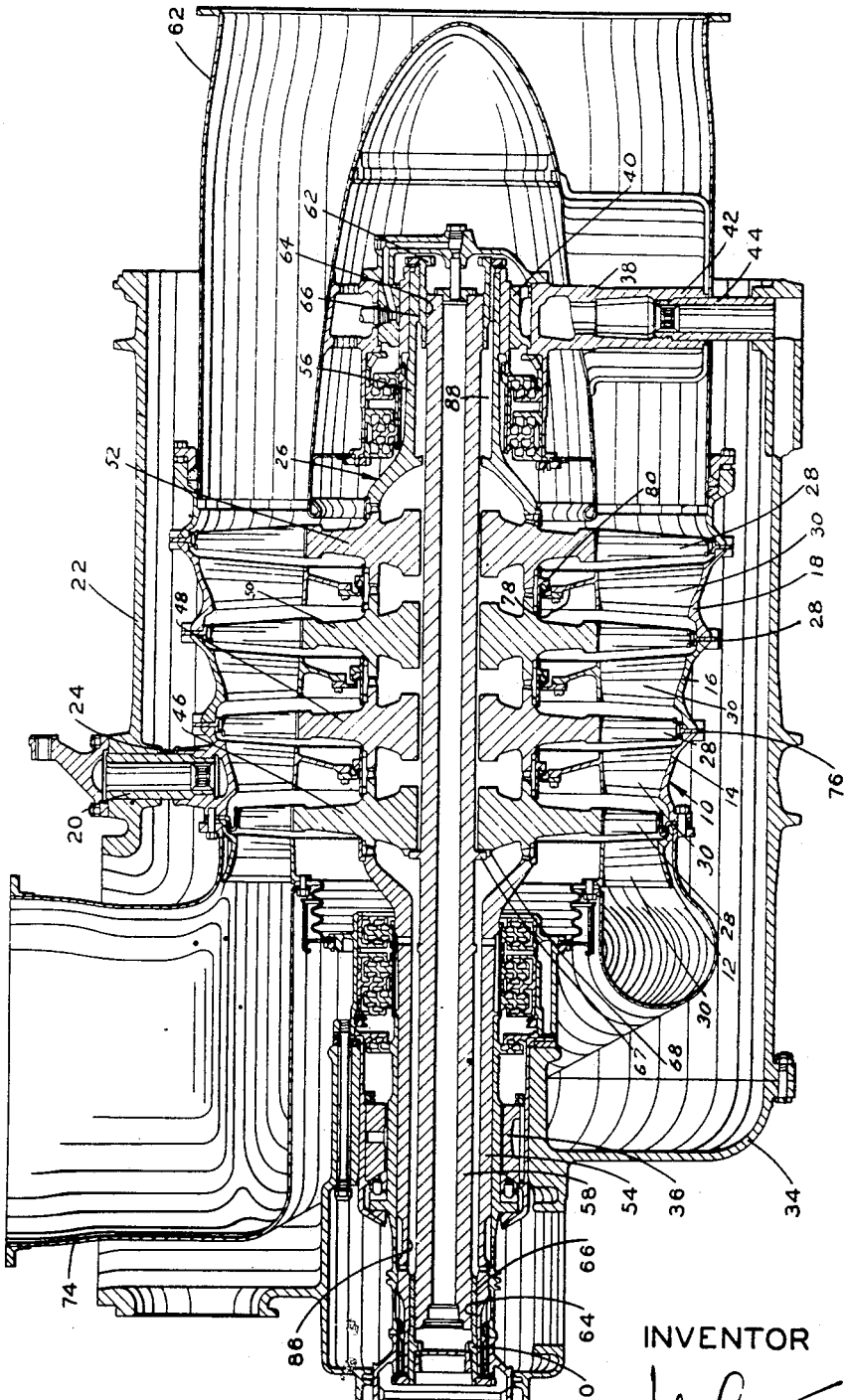
Fig. 1 is a sectional view through a turbine showing an embodiment of the invention.

The invention is shown in connection with a turbine construction, which, as will be understood, is similar in many respects to an axial flow compressor. The turbine shown includes a casing 10 built up of rings 12, 14, 16 and 18 and supported by radial pins 20 in a housing 22. These pins which are all in the same plane, and which constitute the support for the casing within the housing engage bores in bosses 24 in one ring 14 of the casing. Rotor 26, within the casing, has a number of disks with blades 28 alternating with the rows of nozzles 30 in the casing.

Housing 22 has a head 34 which forms a part of the housing and supports a bearing sleeve 36 for the front end of the rotor 26. At the other

2 end of the turbine, the housing 22 supports a mounting 38 within which is a bearing 40 for the rear end of the rotor. Mounting 38 has a number of legs 42 engaging with radial pins 44 which locate the mounting within the housing.

Rotor 26 is made up of a number of discs 46, 48, 50 and 52, and shaft-forming end bells or elements 54 and 56. The discs and the shaft elements are all held together by a central bolt 58. The ends of the bolt are connected to the end elements by threaded sleeves 60 and 62. Each sleeve 60, 62, has inner threads 64 engaging with cooperating threads on the bolt and outer threads 66 engaging threads on the end elements. On one of the sleeves (sleeve 60 as shown) the inner threads 64 have a greater pitch than the outer threads so that, as the ring is screwed into place, a tension may be applied to the bolt. Rotation of the bolt is prevented during the tightening operation by radially extending lugs 67 engaging slots 68 in one rotor disk.

Since the casing is built up of casing rings each having a row of nozzles and bolted together axially, and since the rotor is built up of discs, each having a row of blades, it is apparent that the turbine is adapted for endwise assembly. To assist in aligning the discs during assembly, to prevent relative rotation in operation, and to be able to transmit torque, each disk has projecting annular flanges 69 and 70, Fig. 2, on opposite sides, these flanges having elements preferably in the form of face splines or clutch teeth 72 engaging similar elements on the adjoining disc. Similarly, the inner ends of shaft elements 54 and 56 have face splines or teeth engaging with splines 72 on the end discs.

The splines, as shown in Figs. 2 and 3, are in the form of spaced teeth, the side surfaces of which are generated by a forming tool rotating about an axis spaced from the center of the disk so that the opposed surfaces of the teeth are curved between outer and inner ends to a sufficient degree to prevent radial motion between adjoining disks when they are bolted together with the splines in engagement. The opposite surfaces of each tooth converge axially toward the top surface of the tooth and the dimensions of the teeth are such that the top surface of the tooth does not engage the base of the cooperating groove in which the tooth fits. Alignment of adjoining disks is entirely by the curved side surfaces of the teeth. Since no motion between the interengaging splines is possible the teeth will be free from galling and all relative radial motion between adjoining discs will be prevented.

In addition to assuring accurate alignment of the several discs and preventing relative radial expansion between adjoining discs, the face splines provide a structure which permits disassembly of the rotor if desired. The discs which make up the power section of the turbine rotor have central openings 84 and the shaft elements 54 and 56 have central openings 86 and 88 through which the central bolt extends.

Working fluid enters the first stage nozzles of the turbine through an inlet scroll 74 which is attached to the end of the first element of casing 10. Leakage of working fluid past the outer ends of the blades is prevented by seals 76 which may be positioned between adjoining casing rings. Leakage of working fluid around the inner edges of the casing rings 78 extending inwardly from each row of nozzles is prevented by a labyrinth seal 80. The turbine discharges through a duct 82 connected to the end casing ring and surrounding the rear bearing mounting.

Although the invention has been described in connection with a turbine, it will be understood that it is equally adapted to the rotor construction of an axial flow compressor where many of the same problems of construction and assembly exist.

It is to be understood that the invention is not limited to the specific embodiment herein illustrated and described, but may be used in other ways without departure from its spirit as defined by the following claims.

I claim:

1. A turbine rotor construction including a number of discs each having a central opening, each of said discs having a row of blades on its periphery extending radially therefrom, said discs having annular flanges on opposite sides thereof concentric to and spaced from the opening, and interengaging teeth on the ends of the flanges, said teeth extending axially and having opposite side surfaces converging in an axial direction, the converging surfaces being curved between inner and outer ends on the same radius to provide contact between the teeth substantially over the entire length of the side surfaces to prevent relative radial motion between adjoining discs, and means for holding said discs together with said teeth in interengagement, said means having contact with said discs only through the teeth on the flanges on the outer sides of the end discs.

2. A rotor including a number of discs having central openings therein, each of said discs having interengaging clutch teeth on the adjoining surfaces of the discs, the side surfaces of said teeth being curved between inner and outer edges on substantially the same radius to prevent relative radial expansion between adjoining discs, and a central bolt extending through said discs and holding the discs together, said bolt being smaller in diameter than the central openings in the discs.

3. A rotor including a number of discs each having a central opening, annular flanges on opposite sides of each disc concentric to and spaced from the opening, and interengaging clutch teeth on the ends of the flanges, said teeth having opposite side surfaces converging in an axial direction, the converging surfaces being curved between inner and outer ends on substantially the same radius to prevent relative radial motion between adjoining discs, and means for holding said discs together with said teeth in interengagement, said means having contact with said discs only through the teeth on the flanges on the outer sides of the end discs.

4. A rotor including a number of discs each having a central opening, annular flanges on opposite sides of each disc concentric to and spaced from the opening, and interengaging teeth on the ends of the flanges, said teeth having opposite side surfaces converging in an axial direction, the converging surfaces being curved between inner and outer ends on substantially the same radius to prevent relative motion between adjoining discs, and a centrally located through bolt extending through the central openings in the discs and holding said discs together with said teeth in interengagement, said through bolt being smaller in diameter than the central openings in the discs and out of contact with the discs, except through the teeth on the flanges on the outer sides of the end discs.

5. A rotor construction including a number of discs each having a central opening therein, said discs having cylindrical flanges on opposite sides thereof, interengaging teeth on said flange to align the disc, said teeth having opposite sides surfaces converging in axial direction, the converging surfaces being curved between inner and outer ends on substantially the same radius to assure contact between the side surfaces of the teeth over substantially the entire length of the teeth to prevent relative radial motion between adjoining discs, said flanges being spaced from the central openings in the discs, end bells forming shafts at opposite ends of the said discs, each end bell having a flange thereon with teeth engaging with the teeth on the flange on the outer side of the adjacent end disc and a through bolt extending between and engaging with said end bells and through the openings in the disc for holding said end bells against the discs and for holding the discs together with the teeth in interengagement, said through bolt being smaller in diameter than the central openings in the discs and being out of contact with the discs.

VAL CRONSTEDT.

REFERENCES CITED

The following references are of record in the file of this patent:

UNITED STATES PATENTS

| Number | Name | Date |
|---|---|---|
| 1,551,402 | Junggren | Aug. 25, 1925 |
| 2,308,233 | Schutte | Jan. 12, 1943 |
| 2,384,582 | Wildhaber | Sept. 11, 1945 |
| 2,384,584 | Wildhaber | Sept. 11, 1945 |

FOREIGN PATENTS

| Number | Country | Date |
|---|---|---|
| 74,422 | Austria | May 31, 1913 |
| 492,252 | Germany | Feb. 20, 1930 |